(12) United States Patent
Holmes (10) Patent No.: US 7,909,124 B2
(45) Date of Patent: Mar. 22, 2011

(54) POWER SYSTEMS FOR HYBRID ELECTRIC VEHICLE (HEV)

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 393 days.

(21) Appl. No.: 12/061,437

(22) Filed: Apr. 2, 2008

(65) Prior Publication Data

US 2009/0250279 A1  Oct. 8, 2009

(51) Int. Cl.
*B60W 10/26* (2006.01)
(52) U.S. Cl. .................................. 180/65.265; 318/139
(58) Field of Classification Search .... 180/65.21–65.29; 320/104, 116–123; 307/18
See application file for complete search history.

(56) References Cited

U.S. PATENT DOCUMENTS

| | | | |
|---|---|---|---|
| 6,806,671 B2 * | 10/2004 | Kusaka et al. | 318/442 |
| 6,930,404 B1 * | 8/2005 | Gale et al. | 290/40 C |
| 6,947,855 B2 | 9/2005 | Verbrugge et al. | |
| 7,267,090 B2 | 9/2007 | Tamai et al. | |
| 7,643,733 B2 * | 1/2010 | El-Antably et al. | 388/820 |

OTHER PUBLICATIONS

El-Antably, Ahmed, "Control Device For Driving A Brushless DC Motor," U.S. Appl. No. 11/829,216, filed Jul. 27, 2007, unpublished.

* cited by examiner

*Primary Examiner* — J. Allen Shriver, II
*Assistant Examiner* — Erez Gurari
(74) *Attorney, Agent, or Firm* — Ingrassia Fisher & Lorenz, P.C.

(57) ABSTRACT

A hybrid electric vehicle (HEV) power system is provided that includes a vehicle electrical system (VES), an inverter-controller unit (ICU) and an AC electric motor/generator unit (MGU). The VES includes a first DC voltage source and a second DC voltage source coupled in series with the first DC voltage source. The VES also includes a first electrical load coupled across the first DC voltage source, and a second electrical load coupled across the second DC voltage source. The ICU is coupled across the first DC voltage source and the second DC voltage source and is designed to convert DC power from the first DC voltage source and the second DC voltage source to generate AC power for the AC electric MGU. Together the DC voltage sources can replace a conventional high-voltage DC voltage source. In some implementations, techniques are provided for "charge balancing" the first DC voltage source and the second DC voltage source without expensive devices.

18 Claims, 4 Drawing Sheets

POWER SYSTEMS FOR HYBRID ELECTRIC VEHICLE (HEV)

TECHNICAL FIELD

The present invention generally relates to hybrid electric vehicles, and more particularly relates to methods and apparatus for providing power to electrical loads used in HEV power systems.

BACKGROUND OF THE INVENTION

A hybrid electric vehicle (HEV) utilizes an electric motor/generator unit (MGU) that includes an alternating current (AC) electric motor in conjunction with an internal combustion engine (ICE), and an electronic control unit (ECU) that controls use of the MGU and the ICE to improve efficiency. In some HEVs, the ICE drives a generator which in turn powers the electric MGU to power the vehicle. In other HEVs, both the electric MGU and the ICE can provide power to drive the vehicle's transmission depending on the mode of operation.

In addition to the MGU, most HEVs include an inverter-controller unit that includes an inverter module controlled by a control unit. The inverter module includes a number of inverter sub-modules. The AC electric motor includes a number of motor windings which can be coupled to the inverter sub-modules. The inverter sub-modules can be rapidly switched by a control unit to convert the DC power provided by a battery to AC power. The inverter module provides this AC power to the AC electric motor to sequentially energize the motor windings at appropriate times to produce a rotating magnetic field that causes rotation of the AC electric motor's permanent magnetic rotor and drives the AC electric motor. In addition to supplying power to the MGU when it acts as a motor, the battery can receive power from the MGU when it acts as a generator, which allows the HEV to recharge the battery with power recovered from braking or with power from the ICE.

In addition to the propulsion battery, which is often high-voltage, that is more than 60 volts, many HEVs also employ a low-voltage auxiliary battery (i.e., a 12-volt car battery) to power various vehicle electrical loads. The low-voltage auxiliary battery can be recharged by an auxiliary power module (APM) that manages charge across the low-voltage auxiliary battery. The APM can function as a DC-to-DC converter that converts electric power at the higher voltage of the propulsion battery to electric power at the low voltage of the low-voltage auxiliary battery and vehicle electrical loads.

Accordingly, it is desirable to provide an HEV power system that is less expensive to manufacture and maintain. For instance, it would be desirable to eliminate the need for separate high-voltage and low-voltage batteries and/or the need to expensive components such as the APM. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments of the present invention relate to hybrid electric vehicles (HEVs). According to one embodiment, a hybrid electric vehicle (HEV) power system is provided that includes a vehicle electrical system (VES), an inverter-controller unit (ICU) and an AC electric motor/generator unit (MGU). The VES includes a first DC voltage source and a second DC voltage source coupled in series with the first DC voltage source. The VES also includes a first electrical load coupled across the first DC voltage source, and a second electrical load coupled across the second DC voltage source. The ICU is coupled across the first DC voltage source and the second DC voltage source and is designed to convert DC power from the first DC voltage source and the second DC voltage source to generate AC power for the AC electric MGU.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

The disclosed methods and apparatus will now be described as applied to a hybrid/electric vehicle (HEV). However, it will be appreciated by those skilled in the art that the same or similar techniques can be applied in the context of other AC systems, including those using so-called "brushless DC" motors which are powered from DC voltage sources. In this regard, any of the concepts disclosed here can be applied generally to "vehicles," and as used herein, the term "vehicle" includes, but is not limited to, automobiles such as cars, trucks, sport utility vehicles, and vans, watercraft such as boats and ships, and self-propelled industrial equipment such as forklifts, front-end-loaders, and robots. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

Exemplary Embodiments

Figure 1:
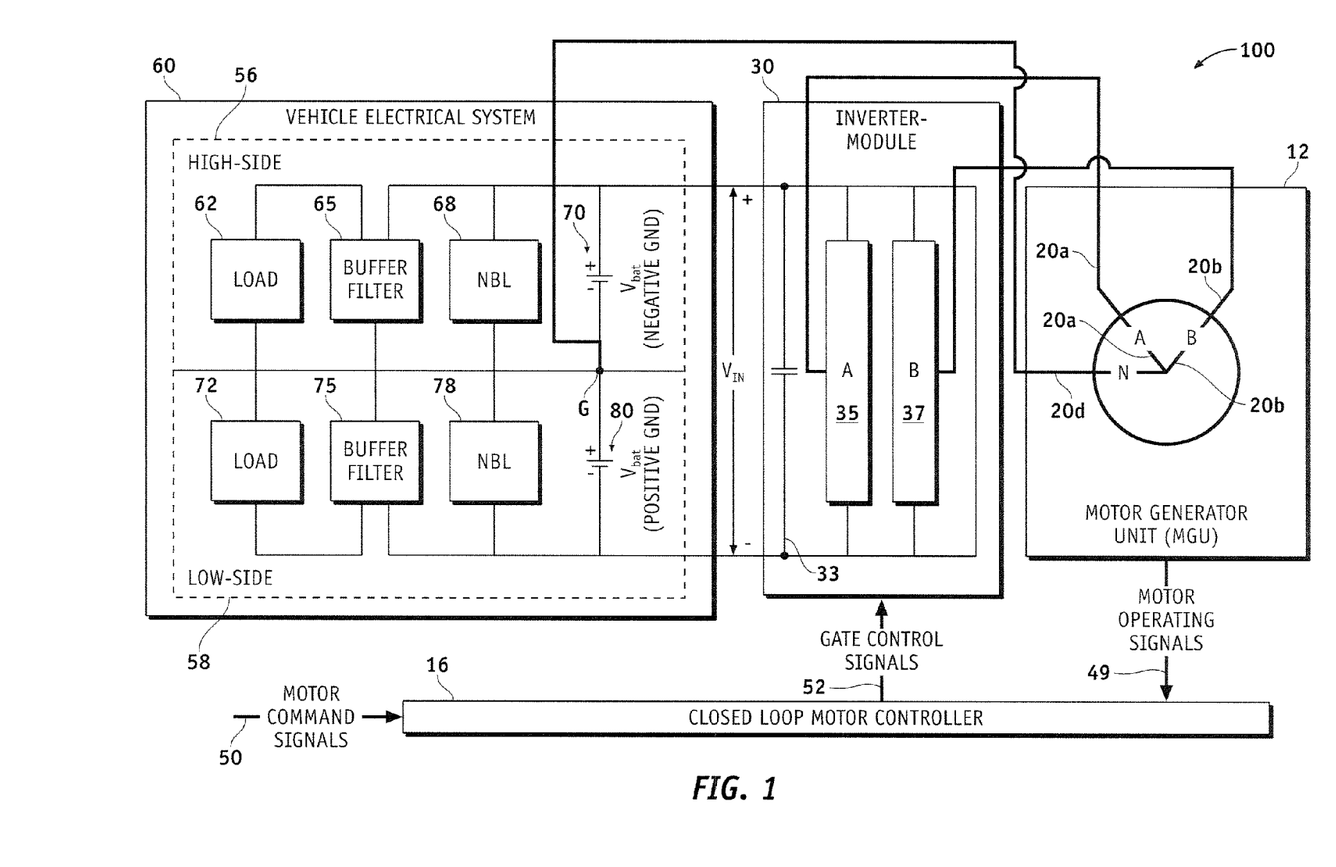
FIG. 1 is a simplified block diagram of a hybrid electric vehicle (HEV) power system which can be implemented in a hybrid/electric vehicle (HEV) according to one exemplary implementation of the present invention.

FIG. 1 is a simplified block diagram of a hybrid electric vehicle (HEV) power system 100 which can be implemented in a hybrid/electric vehicle (HEV) according to one exemplary implementation of the present invention. The HEV power system 100 includes a Motor/Generator Unit (MGU) comprising a two-phase AC induction motor 12, an inverter-controller unit (ICU) comprising a closed loop motor controller (or "control unit") 16 and an inverter module 30, and a Vehicle Electrical System (VES) 60. Embodiments of the present invention can provide different vehicle electrical loads of the VES 60 with independent, auxiliary, low-voltage DC sources (e.g., 12 volt batteries) while eliminating the need additional devices or circuits to manage or control the voltage of the multiple low-voltage DC sources. Vehicle electrical loads are split into different groups, and each of these groups is coupled to its own auxiliary low-voltage DC source such that the loads are "split" into separate electrical circuits. Thus, in contrast to a conventional HEV that includes a single high-voltage battery and a single 12-volt auxiliary battery, the disclosed embodiments implement two or more auxiliary low-voltage DC sources so that the electrical loads can be separated into groups and powered separately. In addition, the two or more low-voltage DC sources can be utilized to power an inverter module and AC motor of the HEV. As such, this architecture can eliminate the need for a high-voltage battery and/or expensive components such as an APM.

In this particular embodiment, the MGU includes a relatively uncommon, two-phase AC induction motor 12 (sometimes also referred to as a two-phase AC motor) that includes motor windings 20a, 20b and a neutral point N where motor winding 20a is coupled to motor winding 20b. In this implementation, the current flows into and out of winding A 20a and flows into and out of winding B 20b. Phases A and B in FIG. 1 are orthogonal which allows for construction of a perfect rotating field. At times, current is "left over" from the sum of the two phases and must therefore flow into and out of the neutral N and coupling entity 20d (e.g. cable). Although not illustrated in FIG. 1, the MGU can be driven by an internal combustion engine (ICE) as an alternator, and the MGU can also function as a starter for an ICE. In one implementation, the MGU is a Belt-connected Alternator Starter (BAS), in that the ICE is connected to the MGU via a belt. In another implementation, the MGU is a Flywheel Alternator Starter (FAS), in that the ICE uses the MGU as its flywheel, on the crankshaft of the engine.

The ICU includes a two-phase inverter module 30 that is coupled to the two-phase AC induction motor 12. The two-phase inverter module 30 includes a capacitor 33 and two inverter sub-modules 35, 37. Although not illustrated in FIG. 1, in one implementation, the inverter sub-modules 35, 37 each comprise a pair of switches (e.g., two field effect transistors (FETs) and two diodes). The inverter sub-modules 35, 37 are coupled to motor windings 20a, 20b of two-phase AC induction motor 12 using any techniques or mechanism known in the art. As described in more detail below, the inverter module 30 is also coupled to the VES 60 across a pair of low-voltage DC voltage sources 70, 80 connected electrically in series such that the inverter module 30 receives a compound voltage ($V_{IN}$) that is the sum of the two low-voltage DC voltage source 70, 80. As will be appreciated by those skilled in the art, the inverter sub-modules 35, 37 convert the compound direct current (DC) voltage ($V_{IN}$) provided from the auxiliary low-voltage DC sources 70, 80 to alternating current (AC). The outputs generated by the inverter sub-modules 35, 37 are applied to motor windings 20a, 20b of the two-phase AC induction motor 12 to drive the two-phase AC induction motor 12.

The closed loop motor controller 16 or "control unit" receives motor command signals 50 from a hybrid system controller (not shown) and motor operating signals 49 from the two-phase AC induction motor 12, and generates control signals 52 for controlling the switching of switches (not illustrated) that are implemented within the inverter sub-modules 35, 37. By providing appropriate control signals 52 to the individual inverter sub-modules 35, 37, the closed loop motor controller 16 controls switching of switches (not illustrated) within those inverter sub-modules 35, 37 and thereby controls the outputs of the inverter sub-modules 35, 37 that are provided to motor windings 20a, 20b, respectively.

The Vehicle Electrical System (VES) 60 is coupled to the inverter module 30, and to a neutral point N of the two-phase AC induction motor 12 via a coupling entity 20d, such as a cable or an electrical path through the frame of the MGU to the chassis of the vehicle. In accordance with this embodiment, the VES 60 includes two independent, low-voltage DC voltage sources 70, 80, and the electrical loads 62, 72 of the VES 60 are split or divided into a high-side electrical circuit 56 and a low-side electrical circuit 58. In the particular non-limiting, exemplary embodiment illustrated in FIG. 1, the electrical loads 62, 72 of the VES 60 are split into two (2) equal portions (e.g., one-half each) by providing a separate high-side auxiliary battery 70 for load(s) 62 on the high-side 56, and another separate low-side auxiliary battery 80 for load(s) 72 on the low-side 58.

In this particular embodiment, the high-side 56 includes the low-voltage DC voltage source 70 coupled in parallel with a non-buffered load 68, a buffer filter 65, and an electrical load 62, which can either a single electrical load or a group of different electrical loads. The non-buffered load 68 and buffer filter 65 are optional components. When implemented, the buffer filter 65 performs a buffering function between the electrical load 62 and the non-buffered load 68 to ensure that sudden or short-term voltage drops at the DC voltage source 70 do not significantly impact voltage at the electrical load 62. Because these are short-term changes, the buffer filter 65 does not need to store a large amount of energy, and so it may be a typical electronic filter based on a capacitor, rather than a secondary battery. In one exemplary implementation, the buffer filter 65 comprises a diode and a capacitor (not illustrated) that takes time to charge up and temporarily holds the voltage across load 62 at its current level. The capacitor helps to ensure that the voltage across load 62 will not change dramatically when there is a voltage change, for example, across high-side auxiliary battery 70.

Similarly, the low-side 58 includes the low-voltage DC voltage source 80 coupled in parallel with a non-buffered load 78, a buffer filter 75, and an electrical load 72 as described above. As above, the non-buffered load 78 and the buffer filter 75 are optional, and the buffer filter 75 performs a buffering function between the electrical load 72 and the non-buffered load 78 to ensure that short-term voltage drops at the DC voltage source 80 do not significantly impact voltage at the electrical load 72. A specific implementation of the non-buffered loads and buffer filters will be described below with reference to FIG. 3.

In this embodiment, node G is connected to chassis ground such that the two low-voltage DC sources 70, 80 share a common ground. The chassis (not illustrated in FIG. 1) is assumed to be at approximately zero volts or "ground." The DC voltage sources 70, 80 are coupled together in series at a common node G that is maintained at (or approximately at) ground potential. In one implementation, the common node G can be coupled or connected to the HEV's chassis (not illustrated). In this implementation, the DC voltage source 70 includes a negative terminal coupled to the chassis of the HEV at the common node G, and the DC voltage source 80 includes a positive terminal coupled in series to the DC voltage source 70 at the common node G such that the voltage sources 70, 80 generate a compound voltage ($V_{IN}$) equal to a sum of the voltage ($V_{bat}$) of the low-side DC voltage source 80 and the voltage ($V_{bat}$) of the high-side DC voltage source 70. This compound voltage ($V_{IN}$) can be used not only for powering electrical loads, but also for powering the inverter module 30 thereby eliminating the need for a separate propulsion battery that is commonly used in HEVs.

The DC voltage sources 70, 80 can each be implemented using any energy-storing DC voltage source, which in most cases, are low-voltage, 12-volt car batteries. When the low-voltage DC sources 70, 80 are 12-volt car batteries, the low-voltage DC sources 70, 80 can be referred to as a high-side auxiliary battery 70 and a low-side auxiliary battery 80. The high-side 56 is "negatively grounded" since the negative terminal of the high-side auxiliary battery 70 is coupled to the chassis (not illustrated in FIG. 1) at node G, and the low-side 58 is "positively grounded" since the positive terminal of low-side auxiliary battery 80 is coupled to the chassis (not illustrated in FIG. 1) at node G. When the auxiliary low-voltage DC sources 70, 80 are standard 12 volt car batteries, the compound voltage ($V_{IN}$) drop between the high-side 56 and low-side 58 is 24 volts in total. Thus, the auxiliary batteries 70, 80 together effectively provide a 24-volt battery for use by the inverter module 30 (and hence the two-phase AC induction motor 12) thereby eliminating the need for a separate propulsion battery that is usually required in many HEVs to power the two-phase AC induction motor 12.

The electrical loads 62, 72 can generally represent any module and/or sub-module which is driven by or consumes power from the auxiliary low-voltage DC sources 70, 80. Examples of the vehicle electrical loads 62, 72 include, for example, vehicle accessories, modules, devices, components or circuits, such as lights, audio systems, entertainment systems, power steering, an ECU, a starter, electrically actuated pumps, fans, sensors, controllers, actuators, valves and other electronic components. Many electrical loads 62 are complex devices which depend on the nearly universal "negative-ground convention." The electrical loads 62 are connected to across the negative-ground battery 70 on the high-side 56. Other electrical loads for which the voltage direction of grounding does not matter (e.g., devices such as lamps) can be connected across either the positive-ground auxiliary battery 80 on the low-side 58 or the negative-ground auxiliary battery 70 on the high-side 56.

Ideally, the electrical loads 62, 72 are divided such that the power drawn by electrical loads 62 on the high-side 56 and electrical loads 72 on the low-side 58 is approximately the same (at least on an average basis). However, because it is impossible to predict the precise usage of the electrical devices that correspond to the electrical loads 62, 72, other embodiments of provide techniques for helping to regulate the charge and hence voltage maintained across each of the auxiliary low-voltage DC sources 70, 80. For example, if load 62 is a fan and load 72 is a radio module, and the driver is running the fan, but not listening to the radio, then the charge consumed from the negative-ground battery 70 on the high-side 56 would be much more than that consumed from the positive-ground battery 80 on the low-side 58. If this usage pattern continued on a regular basis, then a large charge imbalance could result in the auxiliary batteries 70, 80.

As illustrated in FIG. 1, in accordance with this embodiment of the invention, the coupling entity 20d is provided that couples a neural point N of the two-phase AC induction motor 12 to node G of the VES 60. The coupling entity 20d can be a connector, wire or any other electrically conducting entity which can be used to electrically couple or connect two points to each other. By coupling the neutral point N of the two-phase AC induction motor 12 to the common node G of the VES 60 via the coupling entity 20d, the voltage on coupling entity 20d can be controlled to regulate the respective voltages maintained at the DC voltage sources 70, 80. The average voltage across each of the low-voltage DC sources 70, 80 over time is equal to one-half of the compound voltage ($V_{IN}$) across the inverter module 30. To explain further, the voltage across each of the low-voltage DC sources 70, 80 fluctuates over time depending on the open/close state of switches (not shown) in the inverter sub-modules 35, 37 of the inverter module 30, but is, on average, equal to the voltage (VIN) supplied to the inverter module 30 (i.e., halfway between the +,− inputs to the inverter module 30). In other words, the voltage of the neutral wire 20d is maintained (on average) half-way between the voltage of the positive side of the high-side auxiliary battery 70 and the negative side of the low-side auxiliary battery 80. This prevents either one of the high-side auxiliary battery 70 and the low-side auxiliary battery 80 from completely discharging.

The two-phase AC induction motor 12 performs a charge balancing function to maintain levels of charge stored at the DC voltage sources 70, 80 at substantially the same levels regardless of usage of the DC voltage sources 70, 80 by the respective load(s) 62, 72 that are coupled across each of the DC voltage sources 70, 80. As such, the respective voltages ($V_{bat}$) at the respective DC voltage sources 70, 80 are maintained at substantially the same levels regardless of usage. Thus, by coupling the neutral point N of the two-phase AC induction motor 12 to the common node G of the VES 60, the two-phase AC induction motor 12 can keep the DC voltage sources 70, 80 charge-balanced with respect to one another so that they remain at approximately the same state of charge.

In particular, the closed loop motor controller 16 controls a sequence at which the switches (not shown) in inverter sub-modules 35, 37 are turned on such that the correct amounts of power are provided to the high-side 56 and low-side 58 of the electrical system VES 60 to maintain the levels of charge stored at the DC voltage source 70 and at the DC voltage source 80 at substantially the same levels regardless of usage of the electrical load(s) 62 and the electrical load(s) 72 so that the respective voltages at each of the DC voltage source 70 and the DC voltage source 80 are maintained at substantially the same levels regardless of power consumed by the electrical load(s) 62 and the electrical load(s) 72, respectively. For example, in some operating conditions, the closed loop motor controller 16 controls the electromagnetic wave forms that are generated at the neutral point N away from a perfect balance during motoring, generating, or both, to draw less power from the particular one of the DC voltage source 70, 80 with the weaker state of charge and/or to send more power to that same DC voltage source 70. For example, the switches in one of the inverter sub-modules 35 can be left on for a disproportion amount of time (in comparison to the other switches in the other inverter sub-module 37) without depleting the charge at one of the DC voltage source 70, 80. For example, low-side auxiliary DC voltage source 80 still receives an appropriate amount of charge to keep it charged even though load 72 is consuming more energy/power than load 62. Thus, even when the buffered loads 62, 72 are not utilized in an equal manner by the operator of the vehicle, the DC voltage source s 70, 80 will remain balanced. By controlling the individual switches (not shown) in the inverter module 30 in an appropriate manner, the high-side auxiliary DC voltage source 70 and the low-side auxiliary DC voltage source 80 will remain at substantially balanced levels of charge. Thus, by connecting the neutral wire 20b between neutral point N of two-phase AC induction motor 12 and node G in the VES 60, both the high-side auxiliary DC voltage source 70 and low-side auxiliary DC voltage source 80 remain satisfactorily charged.

Moreover, no extra circuitry or devices are needed between the high-side auxiliary DC voltage source 70 and low-side auxiliary DC voltage source 80 to manage the voltage ($V_{IN}$) across these DC voltage source 70, 80 (e.g., to make sure that one of the DC voltage source 70, 80 does not completely discharge). Thus, the need for a separate device which performs charge balancing between batteries high-side auxiliary DC voltage source 70, low-side auxiliary DC voltage source 80 is eliminated. This reduces or eliminates the need for additional electrical components or devices, which can be relatively expensive. Thus, a low-cost hybrid system is provided that is appropriate for low-cost small cars, while offering many of the benefits of more expensive hybrid systems in an optimized cost-benefit relationship. Small cars generate relatively low amounts of power during braking, so that an MGU using 24 volts can capture a majority of the braking energy in ordinary driving with electrical currents that are within the capacity of typical starter cables.

Although FIG. 1 describes an implementation where the MGU utilizes a two-phase AC induction motor, in other embodiments, the MGU may be any other type of AC motor with any number of phases. For example, the MGU may alternately use a permanent-magnet rotor, either with surface-mounted or internal magnets, a type of motor which is sometimes referred to as a "brushless DC motor," especially when the inverter uses relatively simple switching sequences. The MGU may utilize one or more windings on the rotor in addition to permanent magnets (e.g., Lundel alternator) or instead of permanent magnets (e.g., wound-rotor generator). The MGU may have a rotor which, instead of or in addition to permanent magnets, windings or a combination thereof, uses a rotor with iron or other material which is attracted by the rotating magnetic field from the stator (i.e., switched-reluctance or synchronous-reluctance). At the same time, the stator may be of any type known to those skilled in the art of electric motor design, including wire-wound construction with lap windings or wave windings or bar-wound construction.

Of these, specific embodiments are described below with reference to FIGS. 2A-3, where the MGU utilizes a three-phase AC induction motor. In addition, while the embodiment of FIG. 1 is illustrated as including two inverter sub-modules 35, 37, in other embodiments such as those described below with reference to FIGS. 2A-3, the inverter module 30 may be any other type of inverter-controller unit (ICU) configuration (sometimes also referred to as variable frequency drive controller) and may include any other number of inverter sub-modules. For example, as described below with reference to FIGS. 2A and 2B, the inverter module 30 can be implemented as a full-wave bridge inverter that includes three inverter sub-modules 135, 137, 139, or, as described below with reference to FIG. 3, the inverter module 30 can be implemented as a delta inverter that also includes three simplified inverter sub-modules. Moreover, in other embodiments, such as those described below with reference to FIG. 3, more than two (2) auxiliary batteries can be provided and the electrical loads of the VES can be split into more than two (2) equal portions (e.g., three auxiliary batteries each handling one-third of the electrical loads and providing a combined DC voltage of 36 volts for use by the inverter module and MGU).

Figure 2A:
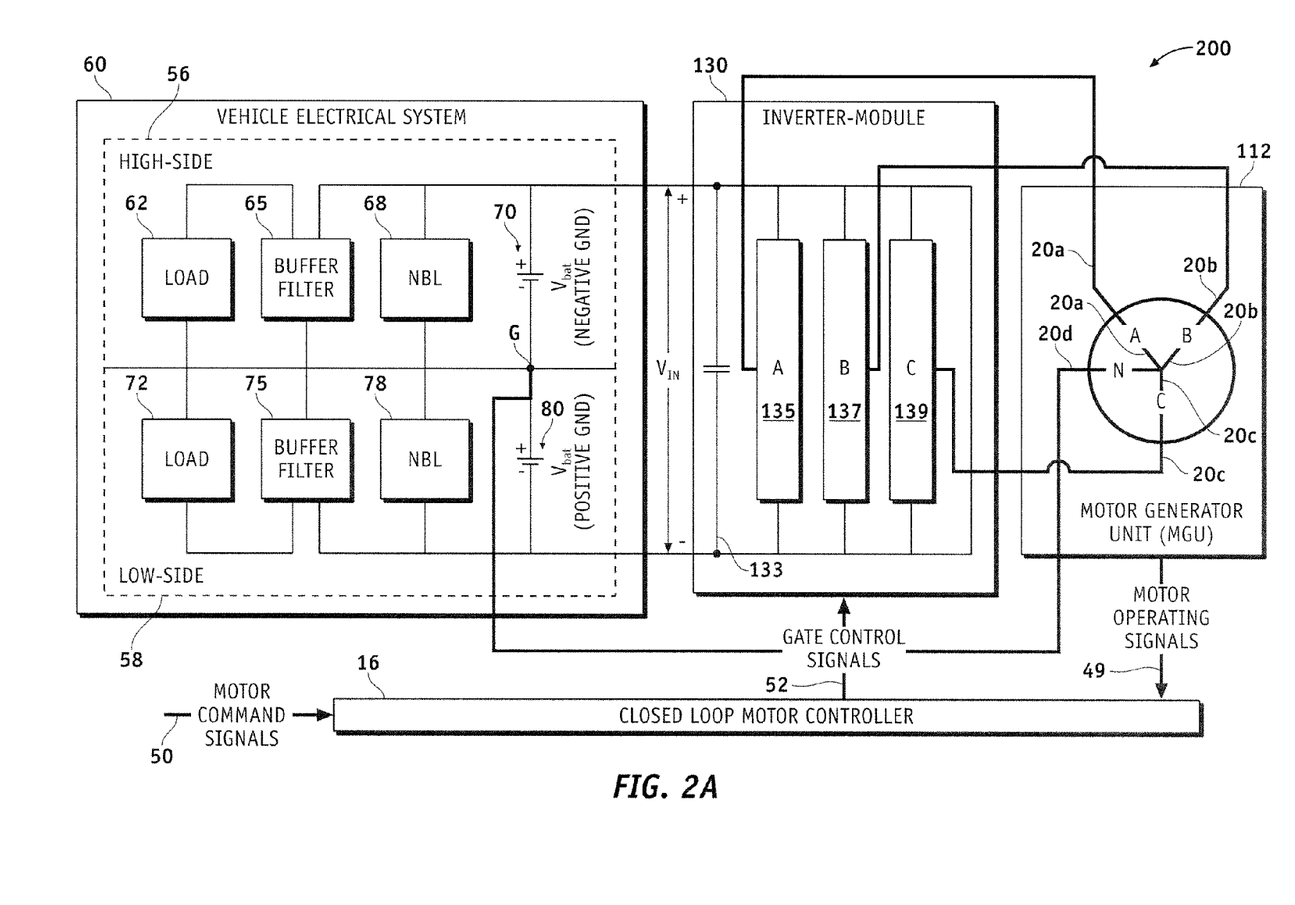
FIGS. 2A and 2B are simplified block diagrams of a hybrid electric vehicle (HEV) power system which can be implemented in a hybrid/electric vehicle (HEV) according to other exemplary implementations of the present invention.
Figure 2B:
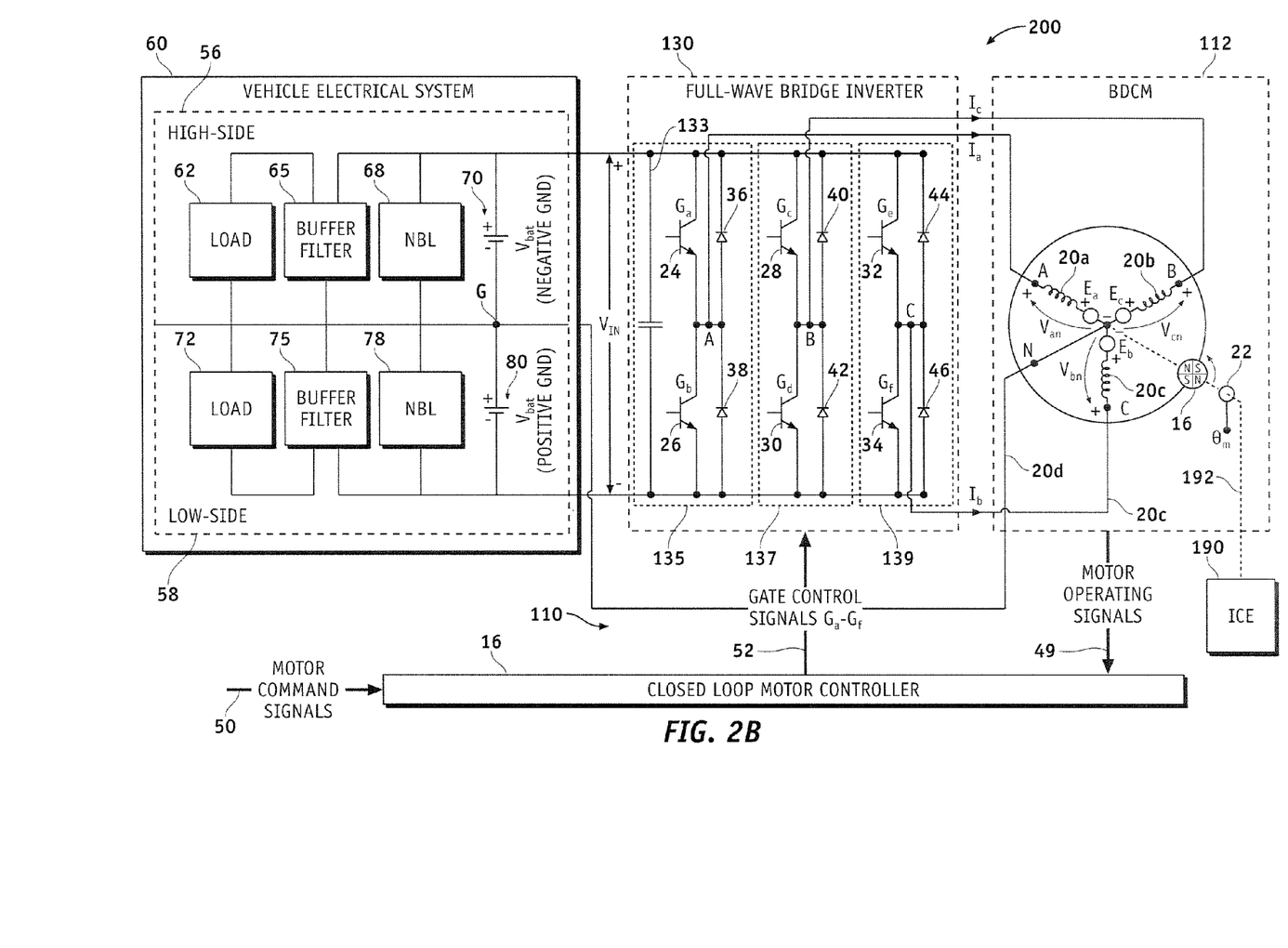

FIGS. 2A and 2B are simplified block diagrams of a hybrid electric vehicle (HEV) power system 200 which can be implemented in a hybrid/electric vehicle (HEV) according to another exemplary implementation of the present invention. In these embodiments, the main difference is that the Motor/Generator Unit (MGU) is a three-phase AC motor 112 having three motor windings 20a, 20b, 20c, and the inverter-controller unit (ICU) the includes a closed loop motor controller 16 and an inverter module 30 includes a capacitor 133 and three inverter sub-modules 135, 137, 139. In this embodiment, inverter sub-module 135 is coupled to motor winding 20a, inverter sub-module 137 is coupled to motor winding 20b, and inverter sub-module 139 is coupled to motor winding 20c. The three-phase AC motor 112 includes three motor windings A, B, C (20a, 20b, 20c) that are coupled together at a neutral point N. The current into motor winding A 20a flows out motor windings B 20b and C 20c, the current into motor winding B 20b flows out motor windings A 20a and C 20c, and the current into motor winding C 20c flows out motor windings A 20a and B 20b.

FIG. 2B illustrates further details of the three-phase AC motor 112 and the inverter sub-modules 135, 137, 139 of FIG. 2A in accordance with one implementation. In FIG. 2B, the MGU includes a star-connected (or Y-connected) three-phase electric motor 112 (sometimes also referred to as a brushless direct current motor (BDCM)), and the inverter module 30 is a full-wave bridge inverter 130.

The star-connected three-phase motor 112 includes a permanent magnet rotor 16, and three stator windings 20a, 20b, and 20c connected in a wye-configuration between motor terminals A, B, and C. Phase currents $I_a$, $I_b$, and $I_c$ flow through respective stator windings 20a, 20b, and 20c. The phase to neutral voltages across each of the stator windings 20a-20c are respectively designated as $V_{an}$, $V_{bn}$, $V_{cn}$, with the back EMF voltages generated in each of the stator windings 20a-20c respectively shown as the voltages $E_a$, $E_b$, and $E_c$ produced by ideal voltage sources each respectively shown connected in series with stator windings 20a-20c. As is well known, these back EMF voltages $E_a$, $E_b$, and $E_c$ are the voltages induced in the respective stator windings 20a-20c by the rotation of permanent magnet rotor 18. Although not necessary for all applications, the motor 112 is also shown equipped with a rotor position sensor 22, which provides an output rotor position signal $\theta_m$ representing the mechanical rotational angular position of rotor 16 relative to the stator windings 20a-20c. Position sensor 22 can be a Hall Effect sensor, or any other type position encoder known in the art. Those skilled in the art will recognize that other techniques exist for determining the angular position of rotor 18, without the use of a rotor position sensor 22 (see for example, U.S. Pat. No. 5,949,204 issued to Huggett et al.) The motor 112 is coupled to an internal combustion engine (ICE) via a drive shaft 192.

The full-wave bridge inverter 130 includes a capacitor 133, a first inverter sub-module 35 comprising a dual switch 24/36, 26/38, a second inverter sub-module 37 comprising a dual switch 28/40, 30/42, and a third inverter sub-module 39 comprising a dual switch 32/44, 34/46. As such, full-wave bridge inverter 130 has six solid state switching devices 24, 26, 28, 30, 32, 34 and six diodes 36, 38, 40, 42, 44, 46 to appropriately switch compound voltage ($V_{IN}$) and provide three-phase energization of the stator windings 20a, 20b, 20c of BDCM 112 (see for example, U.S. Pat. No. 4,544,868 issued Oct. 1, 1985 to Murty, and assigned to the same assignee as the present application).

The closed loop motor controller 16 or "control unit" receives motor command signals 50 and motor operating signals 49 from the motor 112, and generates control signals 52 for controlling the switching of solid state switching devices 24, 26, 28, 30, 32, 34 within the inverter sub-modules

135, 137, 139. By providing appropriate control signals 52 to the individual inverter sub-modules 135, 137, 139, the closed loop motor controller 16 controls switching of solid state switching devices 24, 26, 28, 30, 32, 34 within those inverter sub-modules 135, 137, 139 and thereby control the outputs of the inverter sub-modules 135, 137, 139 that are provided to motor windings 20a, 20b, respectively.

In accordance with embodiments of the present invention, a coupling entity 20d is provided that connects a neutral point N of the motor 112 to node G of the VES 60, which is at ground potential. In this embodiment, node G is connected to the chassis such that the two low-voltage DC sources 70, 80 share a common ground. The DC voltage sources 70, 80 are coupled together in series at a common node G such that the voltage sources 70, 80 generate a compound voltage ($V_{IN}$) equal to a sum of the voltage ($V_{bat}$) of the low-side DC voltage source 80 and the voltage ($V_{bat}$) of the high-side DC voltage source 70. This compound voltage ($V_{IN}$) can be used not only for powering the electrical loads, but also for powering the ICU 130 thereby eliminating the need for a separate non-auxiliary battery that is commonly used in HEVs.

As illustrated in FIGS. 2A and 2B, in accordance with this embodiment of the invention, the coupling entity 20d couples a neural point N of the motor 112 to node G of the VES 60. The voltage on the coupling entity 20d fluctuates over time depending on the open/close state of switches 24, 26, 28, 30, 32, 34 in the inverter sub-modules 135, 137, 139 of the inverter module 130. However, on average, the voltage on the coupling entity 20d is equal to the voltage ($V_{IN}$) across inverter module 130 (i.e., halfway between the +,− inputs to the inverter module 130). This prevents either one of the high-side auxiliary battery 70 and the low-side auxiliary battery 80 from completely discharging.

The motor 112 performs a charge balancing function to maintain levels of charge stored at the DC voltage sources 70, 80 at substantially the same levels regardless of usage of the DC voltage sources 70, 80 by the respective load(s) 62, 72 that are coupled across each of the DC voltage sources 70, 80. By coupling the neutral point N of the motor 112 to the common node G of the VES 60, the motor 112 can keep the DC voltage sources 70, 80 charge-balanced with respect to one another so that they remain at approximately the same state of charge. As such, the respective voltages ($V_{bat}$) at the respective DC voltage sources 70, 80 are maintained at substantially the same levels regardless of usage.

The closed loop motor controller 16 controls a sequence at which the switches 24, 26, 28, 30, 32, 34 in inverter modules 135, 137, 139 are turned on such that the correct amounts of energy are provided to the high-side 56 and low-side 58 of the electrical system VES 60 to maintain the levels of charge stored at the DC voltage source 70 and at the DC voltage source 80 at substantially the same levels regardless of usage of the electrical load(s) 62 and the electrical load(s) 72 so that the respective voltages at each of the DC voltage sources 70, 80 are maintained at substantially the same levels regardless of power consumed by the electrical load(s) 62, 72, respectively. For example, in some operating conditions, the closed loop motor controller 16 controls the electromagnetic wave forms that are generated at the neutral point N away from a perfect balance during motoring, generating, or both, to draw less power from the particular one of the DC voltage source 70, 80 having the weaker state of charge and/or to send more power to that same DC voltage source 70. For example, the switches in one sub-module of the inverter module 130 can be left on for a disproportion amount of time (in comparison to the other switches in the other inverter sub-modules of the inverter module 130) without depleting the charge at one of the DC voltage source 70, 80. For example, in one scenario, the low-side auxiliary DC voltage source 80 will still receive an appropriate amount of charge to keep it charged even though load 72 is consuming more energy/power than load 62. Thus, even when the buffered loads 62, 72 are not utilized in an equal manner by the operator of the vehicle, the DC voltage sources 70, 80 will remain balanced. By controlling the individual switches in the inverter module 130 in an appropriate manner, the high-side auxiliary DC voltage source 70 and the low-side auxiliary DC voltage source 80 will remain at a near optimal level of charge. Thus, by connecting the neutral wire 20b between neutral point N of motor 112 and node G in the VES 60, both the high-side auxiliary DC voltage source 70 and low-side auxiliary DC voltage source 80 remain satisfactorily charged.

As with the embodiment in FIG. 1, no extra circuitry or devices are needed between the high-side auxiliary DC voltage source 70 and low-side auxiliary DC voltage source 80 to manage the voltage ($V_{IN}$) across these DC voltage source 70, 80 and perform a charge balancing between high-side auxiliary DC voltage source 70, low-side auxiliary DC voltage source 80. By eliminating the need for additional electrical components or devices, a very low cost hybrid system is provided that offers many of the benefits of more expensive hybrid systems.

When AC electric motors are used as a means for propulsion in HEVs, the capacity of the motors and inverters must be substantial due to the large power requirements. In such applications, the inverters can represent a significant portion of the cost, mass, and packaging size of the HEV propulsion system. In addition, the reliability of control devices using such inverters is inversely related to the required number of solid state switching devices and diodes in the inverter. Accordingly, it would be advantageous in some embodiments if fewer solid state switching devices and diodes could be employed in the fabrication of power inverters in control devices used for driving the AC electric motor. In accordance with embodiments of the present invention illustrated in FIG. 3, a three-phase AC induction motor 113 like that in FIGS. 2A and 2B is provided that is driven by a delta-type inverter module, which employs only one-half the solid state switching devices 112, 114, 116 and diodes 124, 126, 128 required in a conventional full-wave bridge type inverter module as described, for example, in FIG. 2B.

Figure 3:
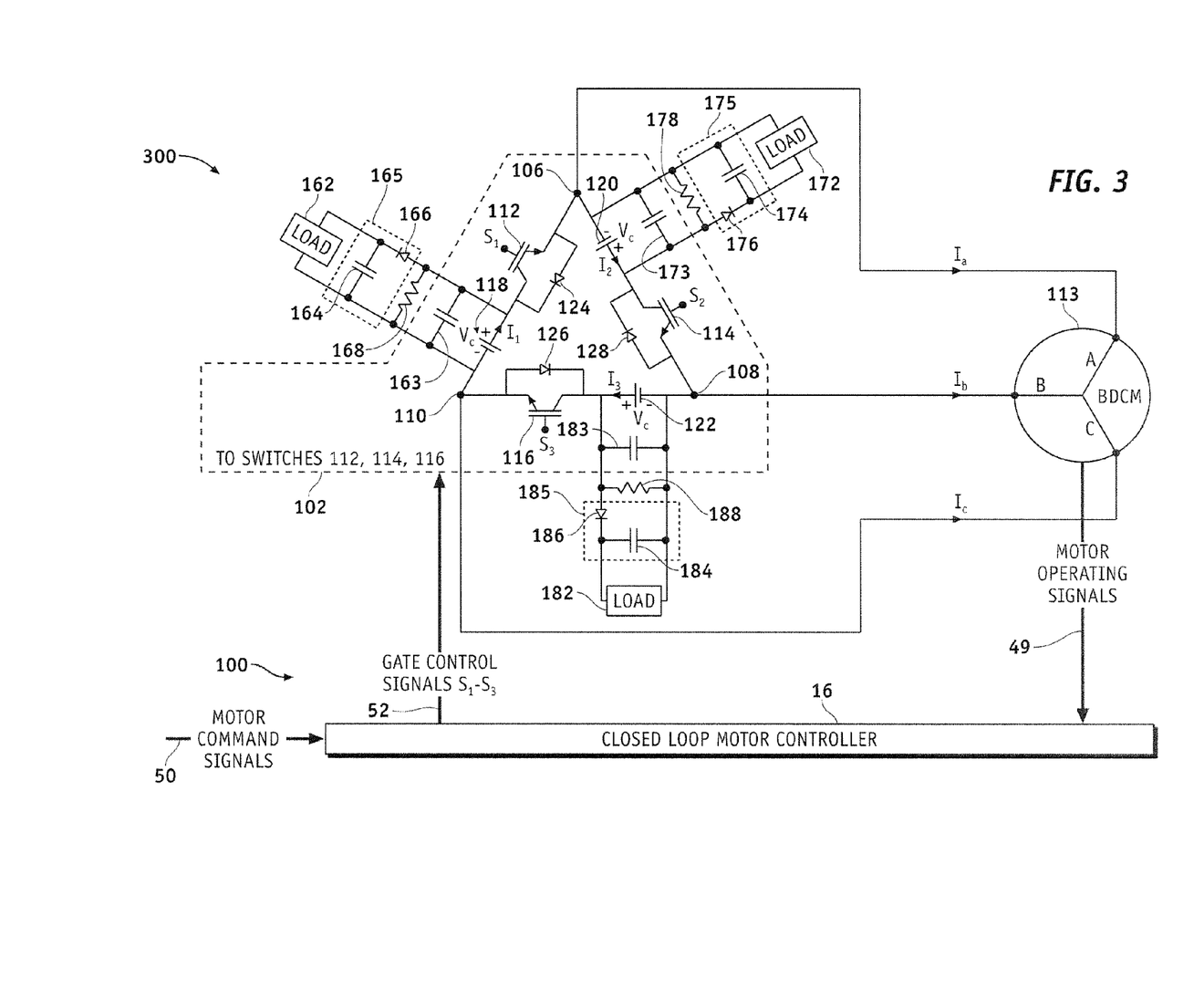
FIG. 3 is a simplified block diagram of a hybrid electric vehicle (HEV) power system which can be implemented in a hybrid/electric vehicle (HEV) according to yet another exemplary implementation of the present invention.

FIG. 3 is a simplified block diagram of a hybrid electric vehicle (HEV) power system 300 which can be implemented in a hybrid/electric vehicle (HEV) according to one exemplary implementation of the present invention. The HEV power system 300 includes a Motor/Generator Unit (MGU) that includes a three-phase AC induction motor 113, an inverter-controller unit (ICU) comprising a closed loop motor controller 16 and a delta inverter module 102, a plurality of DC voltage sources 118, 120, 122 and a Vehicle Electrical System (VES) that includes a plurality of electrical loads 162, 172, 182. Although not illustrated, the three-phase AC induction motor 113 is coupled to an ICE via a drive shaft. Different vehicle electrical loads 162, 172, 182 are provided with independent, auxiliary, low-voltage DC sources 118, 120, 122 (e.g., 12 volt batteries) while eliminating the need additional devices or circuits to manage or control the voltage of the multiple low-voltage DC sources 118, 120, 122. As above, the electrical loads 162, 172, 182 can generally represent any module and/or sub-module which is driven by or consumes power from the auxiliary low-voltage DC sources 118, 120, 122. Vehicle electrical loads 162, 172, 182 can be split into different groups, and each of these groups is coupled to its own auxiliary low-voltage DC sources 118, 120, 122 such that the loads are "split" into separate electrical circuits. Specifically, in this embodiment, three auxiliary low-voltage DC sources 118, 120, 122 are implemented so that the electrical loads 162, 172, 182 can be separated into groups and powered separately.

The delta inverter module 102 is illustrated in the dotted-line triangle, and includes three inverter sub-modules 112/124, 114/128, 116/126. To supply power to the delta inverter module 102, a DC voltage source 118 is coupled between the inverter sub-modules 112/124, 116/126, another DC voltage source 120 is coupled between the inverter sub-modules 112/124, 114/128, and another DC voltage source 122 is coupled between inverter sub-modules 114/128, 116/126. The delta inverter module 102 is coupled to the three-phase AC induction motor 113 via a bus (not illustrated). In this particular embodiment, because the MGU implements a three-phase AC induction motor 113, the ICU includes a three-phase delta inverter module 102 that includes three inverter sub-modules 112/124, 114/128, 116/126. In this embodiment, the inverter sub-modules 112/124, 114/128, 116/126 each comprise a switch (e.g., a field effect transistor (FET)) coupled in parallel with a diode. The inverter sub-modules 112/124, 114/128, 116/126 are coupled to motor windings A, B, C of three-phase AC induction motor 113 using any techniques or mechanism known in the art. The outputs generated by the inverter sub-modules are applied to motor windings A, B, C of the three-phase AC induction motor 113 to drive the three-phase AC induction motor 113.

The DC voltage source 118 powers the first inverter sub-module 112/124, DC voltage source 120 powers inverter sub-module 114/128, and DC voltage source 122 powers inverter sub-module 116/126. DC voltage source 122 is also coupled to inverter sub-module 114/128 at a common node 108. In this embodiment, all segments of the delta inverter module 102 (and the loads 162, 172, 182, supported by those segments) are electrically isolated from the chassis of the HEV. This helps prevent the DC voltage sources 118, 120, 122 from being short-circuited to the chassis or structure of the vehicle by requiring that two connections be made to the chassis to establish the short-circuit. The charge and hence voltage is maintained across each of the auxiliary low-voltage DC sources 118, 120, 122 by varying the switching times of the transistors 112, 114, 116 while the MGU 113 is generating and motoring. In other words, charge balancing is achieved in this embodiment by biasing power from the MGU 113 when it is acting as a generator toward those segments of the delta inverter module 102 where applied loads 162, 172, 182 are greater and by biasing power to the MGU 113 when it is acting as a motor away from those same segments.

The DC voltage sources 118, 120, 122 can be implemented using any controllable DC voltage source, which in most cases, are low-voltage, 12 volt car batteries. When each of the DC voltage sources 118, 120, 122 is a 12 volt battery, the DC voltage sources 118, 120, 122 can provide, in aggregate, 36 volts for driving the three-phase AC induction motor 113 (i.e., the compound voltage drop across the inverter module 102 is 36 volts in total). Thus, the auxiliary low-voltage DC sources 118, 120, 122 can together effectively provide a 36-volt battery for use by the inverter module 102 (and hence the three-phase AC induction motor 113) thereby eliminating the need for a high-voltage battery that is usually required in many HEVs to power the three-phase AC induction motor 113.

The three-phase AC induction motor 113 that includes motor windings A, B, C. Motor winding A is coupled between inverter sub-module 112/124 and DC voltage source 120 at node 106, motor winding B is coupled between inverter sub-module 114/128 and DC voltage source 122 at common node 108, and motor winding C is coupled between inverter sub-module 116/126 and DC voltage source 118 at node 110. In this implementation, the current $I_a$ into winding A flows out winding B and winding C as currents $I_b$, $I_c$, respectively, the current $I_b$ into winding B flows out winding A and winding C as currents $I_a$, $I_c$, respectively, and the current $I_c$ into winding C flows out winding A and winding B as currents $I_a$, $I_b$, respectively.

In the exemplary embodiment illustrated in FIG. 3, the electrical loads 162, 172, 182 are split into three (3) equal portions (e.g., one-third each) by providing separate DC voltage sources 118, 120, 122 for each group of loads. The vehicle electrical loads 162, 172, 182 include a first electrical load 162 (or first group of electrical loads) that is coupled to and supplied power by DC voltage source 118, a second electrical load 172 (or second group of electrical loads) that is coupled to and supplied power by DC voltage source 120, and a third electrical load 182 (or group of electrical loads) is coupled to and supplied power by DC voltage source 122. The electrical loads 162, 172, 182 are distributed so that the relative loads on each branch of the delta inverter module 102 are substantially equal to one another in the expected average current and power such that the DC voltage sources 118, 120, 122 each power one-third of the total electrical loads supported by the VES.

In this particular embodiment, the low-voltage DC voltage source 118 is coupled in parallel with a capacitor 163, a non-buffered load 168, a buffer filter 165, and an electrical load 162, which can either a single electrical load or a group of different electrical loads. The non-buffered load 168 and buffer filter 165 are optional components. When implemented, the buffer filter 165 performs a buffering function between the electrical load 162 and the non-buffered load 168 to ensure that sudden or short-term voltage drops at the DC voltage source 118 do not significantly impact voltage at the electrical load 162. In one exemplary implementation, the buffer filter 165 comprises a diode 166 and a capacitor 164 that takes time to charge up and temporarily holds the voltage across load 162 at its current level. The capacitor 164 helps to ensure that the voltage across load 162 will not change dramatically when there is a voltage change, for example, across the DC voltage source 118. The other branches can include similar capacitor 173, 183, and buffering circuitry 175/178, 185/188, respectively.

The closed loop motor controller 16 or "control unit" receives motor command signals 50 and motor operating signals 49 from the three-phase AC induction motor 113, and generates control signals 52 for controlling the switching of switches $S_1$, $S_2$, $S_3$ within the inverter sub-modules 112/124, 114/128, 116/126. By providing appropriate control signals 52 to the individual inverter sub-modules 112/124, 114/128, 116/126, the closed loop motor controller 16 controls switching of switches (not illustrated) within those inverter sub-modules 112/124, 114/128, 116/126 and thereby control the outputs of the inverter sub-modules 112/124, 114/128, 116/126 that are provided to motor windings A, B, C, respectively.

In particular, the closed loop motor controller 16 controls the timing of the switches 112, 114, 116 in the inverter module 102 to ensure that the amount of power supplied to each load is, on average, balanced so that the DC voltage sources 118, 120, 122 can be kept at relatively the same charge despite differing usage of the loads 162, 172, 182 across each of the DC voltage sources 118, 120, 122. The closed loop motor controller 16 controls a sequence at which the switches in inverter sub-modules 112/124, 114/128, 116/126 are turned on such that the correct amounts of energy are provided to maintain the levels of charge stored at the DC voltage sources 118, 120, 122 at substantially the same levels regardless of usage of the electrical load(s) 162, 172, 182 so that the respective voltages at each of the DC voltage sources 118, 120, 122 are maintained at substantially the same levels regardless of power consumed by the electrical load(s) 162, 172, 182. For example, in some operating conditions, the closed loop motor controller 16 controls the electromagnetic wave forms that are generated within the three-phase AC induction motor 113 away from a perfect balance during motoring, generating, or both, to draw less power from the particular one of the DC voltage sources 118, 120, 122 with the weaker state of charge and/or to send more power to that same DC voltage source 118, 120, 122. For example, in one operating scenario where the usage of load(s) 162 is greater than the usage of load(s) 172, 182, the switch 112 in the inverter sub-module 112/124 can then be left on for a disproportion amount of time (in comparison to the other switches 114, 116 in the other inverter sub-modules 114/128, 116/126) without depleting the charge at one of the DC voltage source 118, 120, 122. For example, auxiliary DC voltage source 118 still receives an appropriate amount of charge to keep it charged even though load 162 is consuming more energy/power than loads 172, 182. Thus, by controlling the individual switches 112, 114, 116 in the inverter module 102 in an appropriate manner, the charge levels of the auxiliary DC voltage sources 118, 120, 122 will remain balanced even when the buffered loads 162, 172, 182 are not utilized in an equal manner by the operator of the vehicle.

Some of the embodiments and implementations are described above in terms of functional and/or logical block components and various processing steps. However, it should be appreciated that such block components may be realized by any number of components configured to perform the specified functions. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A hybrid electric vehicle (HEV) power system, comprising:
    a vehicle electrical system (VES) comprising: a first DC voltage source; a first group of electrical loads comprising a first electrical load coupled across the first DC voltage source; a second DC voltage source coupled in series with the first DC voltage source at a common node that is at approximately ground potential; and a second group of electrical loads comprising a second electrical load coupled across the second DC voltage source;
    an inverter-controller unit (ICU), coupled across the first DC voltage source and the second DC voltage source, the ICU designed to generate AC power based on the first DC voltage source and the second DC voltage source; and
    an AC electric motor/generator unit (MGU) coupled to the ICU and designed to receive the AC power generated by the ICU, and wherein the AC electric motor/generator unit (MGU) further comprises: a first motor winding; a second motor winding; and a neutral point where the first motor winding is coupled to the second motor winding; and
    a coupling entity that electrically couples the neutral point to the common node,
    wherein coupling the first DC voltage source and the second DC voltage source to the neutral point of the Motor/Generator Unit (MGU) via coupling entity allows the Motor/Generator Unit (MGU) to perform a charge balancing function to maintain charge stored at the first DC voltage source and the second DC voltage source at substantially the same levels so that respective voltages ($V_{bat}$) at each of the first DC voltage source and the second DC voltage source are maintained at substantially the same levels regardless of usage of the first DC voltage source and the second DC voltage source.

2. A system according to claim 1, wherein the coupling entity comprises at least one electrical connection that directly connects the neutral point to the common node.

3. A system according to claim 1, wherein the inverter-controller unit (ICU) further comprises:
    an inverter module coupled to the Motor/Generator Unit (MGU) and coupled to the Vehicle Electrical System (VES) across the first DC voltage source and the second DC voltage source such that the inverter module receives a compound voltage ($V_{IN}$) that comprises a sum of the first DC voltage source and the second DC voltage source, and converts the compound voltage ($V_{IN}$) to AC voltages to be applied to motor windings of the Motor/Generator Unit (MGU).

4. A system according to claim 3, wherein the average voltage across the coupling entity is at one-half of the compound voltage ($V_{IN}$) across the inverter module.

5. A system according to claim 3, wherein the Motor/Generator Unit (MGU) comprises a two-phase AC motor, and wherein the inverter module consists of:
    a first inverter sub-module coupled to the first motor winding; and
    a second inverter sub-module coupled to the second motor winding, wherein each of the first and second inverter sub-modules comprises a pair of switches.

6. A system according to claim 5, wherein the ICU further comprises:
    a control unit coupled to the inverter sub-modules, wherein the control unit controls a sequence at which the switches of inverter modules are turned on to maintain charge stored at the first DC voltage source and at the second DC voltage source at substantially the same levels so that the respective voltages at each of the first DC voltage source and the second DC voltage source are maintained at substantially the same levels regardless of usage of the first DC voltage source and the second DC voltage source, respectively.

7. A system according to claim 3, wherein the Motor/Generator Unit (MGU) comprises a three-phase AC motor, and wherein the inverter module comprises:
a first inverter sub-module coupled to the first motor winding;
a second inverter sub-module coupled to the second motor winding; and
a third inverter sub-module coupled to the third motor winding, wherein each of the first, second and third inverter sub-modules comprises a pair of switches.

8. A system according to claim 7, wherein each of the inverter sub-modules comprise at least one switch, wherein the ICU further comprises:
a control unit coupled to the inverter sub-modules, wherein the control unit controls a sequence at which the switches in inverter modules are turned on such that the correct amounts of energy are provided to maintain charge stored at the first DC voltage source and at the second DC voltage source at substantially the same levels so that the respective voltages at each of the first DC voltage source and the second DC voltage source are maintained at substantially the same levels regardless of usage of the first DC voltage source and at the second DC voltage source, respectively.

9. A system according to claim 1, further comprising:
a first non-buffered load, and a first buffer filter that performs a buffering function between the first electrical load and the first non-buffered load to ensure that short-term voltage drops at the first DC voltage source do not impact voltage at the first electrical load;
a second non-buffered load, and a second buffer filter that performs a buffering function between the second electrical load and the second non-buffered load to ensure that short-term voltage drops at the second DC voltage source do not impact voltage at the second electrical load.

10. A system according to claim 1, wherein the common node is coupled to a chassis of the hybrid electric vehicle (HEV),
wherein the first DC voltage source comprises:
a first auxiliary low-voltage battery comprising a negative terminal coupled to the chassis of the HEV at the common node; and
wherein the second DC voltage source comprises:
a second auxiliary low-voltage battery coupled in series to the first auxiliary low-voltage battery and to the chassis of the HEV at the common node,
wherein the first auxiliary low-voltage battery and the second auxiliary low-voltage battery generate a compound voltage equal to a sum of a first voltage ($V_{bat}$) of the first auxiliary low-voltage battery for powering the first group of electrical loads and a second voltage ($V_{bat}$) of the second auxiliary low-voltage battery for powering the second group of electrical loads, wherein the compound voltage is provided to the inverter module.

11. A system according to claim 1, wherein each of the electrical loads comprise a vehicle accessory.

12. A system according to claim 1, wherein the AC electric motor/generator unit (MGU) further comprises:
a first motor winding, a second motor winding and a third motor winding; and
wherein the inverter-controller unit (ICU) comprises an inverter module comprising: a first inverter sub-module and a second inverter sub-module, wherein the second DC voltage source is coupled between the first inverter sub-module and the second inverter sub-module.

13. A system according to claim 12, wherein the inverter module comprises a delta inverter module that further comprises a third inverter sub-module.

14. A system according to claim 13, wherein the first group of electrical loads is coupled to the first DC voltage source such that the first DC voltage source supplies power to the first group of electrical loads, and
wherein the second group of electrical loads is coupled to the second DC voltage source such that the second DC voltage source supplies power to the second group of electrical loads, and wherein the system further comprises:
a third DC voltage source coupled between the second inverter sub-module and the third inverter sub-module, wherein the third DC voltage source is coupled to the second inverter sub-module at a common node that is at ground potential; and
a third group of electrical loads comprising a third electrical load coupled to the third DC voltage source such that the third DC voltage source supplies power to the third group of electrical loads.

15. A system according to claim 14, wherein the first group of electrical loads, the second group of electrical loads and the third group of electrical loads are substantially equal to one another such that the first DC voltage source, the second DC voltage source and the third DC voltage source each power one-third of the total electrical loads supported by the system.

16. A system according to claim 14, wherein the first motor winding is coupled between the first inverter sub-module and the second DC voltage source, wherein the second motor winding is coupled between the second inverter sub-module and the third DC voltage source, and wherein the third motor winding is coupled between the third inverter sub-module and the first DC voltage source.

17. A system according to claim 14, further comprising:
a first non-buffered load, and a first buffer filter that performs a buffering function between the first electrical load and the first non-buffered load to ensure that short-term voltage drops at the first DC voltage source do not impact voltage at the first electrical load;
a second non-buffered load, and a second buffer filter that performs a buffering function between the second electrical load and the second non-buffered load to ensure that short-term voltage drops at the second DC voltage source do not impact voltage at the second electrical load; and
a third non-buffered load, and a third buffer filter that performs a buffering function between the third electrical load and the third non-buffered load to ensure that short-term voltage drops at the third DC voltage source do not impact voltage at the third electrical load.

18. A hybrid electric vehicle (HEV) power system, comprising:
a vehicle electrical system (VES) comprising: a first DC voltage source; a first group of electrical loads comprising a first electrical load coupled across the first DC voltage source; a second DC voltage source coupled in series with the first DC voltage source at a common node that is at approximately ground potential; and a second group of electrical loads comprising a second electrical load coupled across the second DC voltage source;
an inverter-controller unit (ICU), coupled across the first DC voltage source and the second DC voltage source, the ICU designed to generate AC power based on the first DC voltage source and the second DC voltage source; and an AC electric motor/generator unit (MGU) coupled to the ICU and designed to receive the AC power generated by the ICU, and wherein the AC electric motor/generator unit (MGU) further comprises: a first motor winding; a second motor winding; and a neutral point where the first motor winding is coupled to the second motor winding; and a coupling entity that electrically couples the neutral point to the common node, wherein the coupling entity comprises at least one electrical connection that directly connects the neutral point to the common node.

* * * * *